US010629337B2

United States Patent
Yamada et al.

(10) Patent No.: US 10,629,337 B2
(45) Date of Patent: Apr. 21, 2020

(54) PRESSURE SENSOR

(71) Applicant: KITAGAWA INDUSTRIES CO., LTD., Aichi (JP)

(72) Inventors: Kazuki Yamada, Aichi (JP); Yasuo Kondo, Aichi (JP); Lu Zhao, Aichi (JP)

(73) Assignee: KITAGAWA INDUSTRIES CO., LTD., Aichi (JP)

( * ) Notice: Subject to any disclaimer, the term of this patent is extended or adjusted under 35 U.S.C. 154(b) by 0 days.

(21) Appl. No.: 16/349,161

(22) PCT Filed: Nov. 8, 2017

(86) PCT No.: PCT/JP2017/040291
§ 371 (c)(1),
(2) Date: May 10, 2019

(87) PCT Pub. No.: WO2018/088435
PCT Pub. Date: May 17, 2018

(65) Prior Publication Data
US 2019/0267163 A1    Aug. 29, 2019

(30) Foreign Application Priority Data
Nov. 11, 2016 (JP) .................................. 2016-220696

(51) Int. Cl.
*H01C 10/10* (2006.01)
*G01L 1/20* (2006.01)
*H01C 1/14* (2006.01)

(52) U.S. Cl.
CPC .............. *H01C 10/10* (2013.01); *G01L 1/20* (2013.01); *H01C 1/14* (2013.01)

(58) Field of Classification Search
CPC .............. H01C 10/10; H01C 1/14; G01L 1/20
See application file for complete search history.

(56) References Cited

U.S. PATENT DOCUMENTS 3,830,991 A * 8/1974 Durocher ............... H01H 1/029
                                                        200/86 R
4,017,697 A * 4/1977 Larson ................. H01H 13/702
                                                        200/5 A
(Continued)

FOREIGN PATENT DOCUMENTS

JP       S55131707 U    9/1980
JP       H09159402 A    6/1997
(Continued)

OTHER PUBLICATIONS

JP H1183644 (also filed as JP H09-260964), Fukumura et al., Mar. 1999. Machine translation of Description. (Year: 1999).*
(Continued)

*Primary Examiner* — Kyung S Lee
(74) *Attorney, Agent, or Firm* — Meunier Carlin & Curfman LLC

(57) ABSTRACT

A pressure sensor includes a variable resistance portion, and a first electrode and a second electrode. The variable resistance portion includes a conductive foam elastomer material. When pressure is applied to the variable resistance portion, the variable resistance portion is compressed in accordance with the pressure. As the compression amount increases, the electric resistance of the variable resistance portion decreases. The first electrode and the second electrode are configured to contact with the variable resistance portion at a location having an interval of 0.5 mm or greater with each other, therefore being electrically connected via the variable resistance portion.

6 Claims, 6 Drawing Sheets

(56) References Cited

U.S. PATENT DOCUMENTS

| | | | | |
|---|---|---|---|---|
| 6,483,055 | B1* | 11/2002 | Tanabe | H01H 3/141 |
| | | | | 200/512 |
| 7,112,755 | B2* | 9/2006 | Kitano | G01L 1/20 |
| | | | | 200/17 R |
| 7,528,337 | B2* | 5/2009 | Tanabe | G01L 1/20 |
| | | | | 200/511 |
| 7,772,960 | B2* | 8/2010 | Baker | H01C 10/10 |
| | | | | 338/114 |
| 8,310,017 | B2* | 11/2012 | Mori | G01L 1/20 |
| | | | | 257/415 |
| 8,368,505 | B2* | 2/2013 | Deppiesse | H03K 17/965 |
| | | | | 338/114 |
| 2003/0151103 | A1 | 8/2003 | Endo et al. | |
| 2004/0222968 | A1 | 11/2004 | Endo et al. | |
| 2006/0131158 | A1* | 6/2006 | Takiguchi | H01H 13/702 |
| | | | | 200/512 |
| 2007/0022828 | A1* | 2/2007 | Divigalpitiya | H01H 1/029 |
| | | | | 73/862.041 |
| 2010/0050784 | A1 | 3/2010 | Joung | |
| 2011/0084346 | A1 | 4/2011 | Mori | |
| 2014/0076063 | A1 | 3/2014 | Lisseman et al. | |

FOREIGN PATENT DOCUMENTS

| | | |
|---|---|---|
| JP | H1183644 A | 3/1999 |
| JP | 2003242849 A | 8/2003 |
| JP | 2009503867 A | 1/2009 |
| JP | 2010230647 A | 10/2010 |
| JP | 2015531877 A | 11/2015 |

OTHER PUBLICATIONS

International Search Report issued by the International Searching Authority (JP) in Application No. PCT/JP2017/043704; dated Feb. 27, 2018; 2 pages.

Written Opinion of the International Searching Authority (JP) in Application No. PCT/JP2017/043704; dated Feb. 27, 2018; 5 pages.

International Preliminary Report on Patentability issued for International Application No. PCT/JP2017/043704, 15 pages. English translation included.

Form PCT/IB/338 issued in corresponding application No. PCT/JP2017/040291, 1 pg.

Form PCT/IB/373 issued in corresponding application No. PCT/JP2017/040291, 1 pg.

Form PCT/ISA/237 (Translation) issued in corresponding application No. PCT/JP2017/040291, 7 pgs.

International Search Report issued by the International Searching Authority (JP) in Application No. PCT/JP2017/040291; dated Dec. 5, 2017; 2 pages.

* cited by examiner

PRESSURE SENSOR

CROSS-REFERENCE TO RELATED APPLICATION

This international application claims the priority based on Japanese Patent Application No. 2016-220696, filed with the Japan Patent Office on Nov. 11, 2016, and the entire contents of Japanese Patent Application No. 2016-220696 are incorporated herein by reference.

TECHNICAL FIELD

The present disclosure relates to pressure sensors.

BACKGROUND ART

A pressure sensor configured such that a pair of interdigtal electrodes and a resistor layer are stacked has been known (for example, Patent Document 1). Such a pressure sensor is configured such that a slight interval is provided between the interdgital electrodes and the resistor layer. At the time of application of a load in the stacking direction of the interdgital electrodes and the resistor layer, as the load increases, the surface area of contact between the interdgital electrodes and the resistor layer increases. With this configuration, an increase in the load applied to the pressure sensor reduces electric resistance between one interdigital electrode and the other interdigital electrode by the amount of the increase in the surface area of contact between the interdigital electrodes and the resistor layer. By reading this change in the electric resistance, pressure applied to the pressure sensor can be measured.

CITATION LIST

Patent Literature

Patent Document 1: Japanese Unexamined Patent Application Publication No. 2010-230647A

SUMMARY OF INVENTION

Technical Problem

The pressure sensor as described above mostly has a pressure sensitive portion, the surface of which is hard. As a result, when the pressure sensor is placed on a portion to be touched by a person, the person may have a sensation of foreign body. Therefore, it is desired to reduce such a sensation of foreign body. For a sensor other than a pressure sensor, a countermeasure can be provided as a method of reducing such a sensation of foreign body, for example, by attaching a soft member such as a sponge to a surface of a hard portion to mitigate the sensation of foreign body.

However, in the case of a pressure sensor, when a soft member is attached to a pressure sensitive portion, the pressure detection accuracy may decrease. Also, when the soft member is attached to the pressure sensitive portion, a range from a lower limit value to an upper limit value where pressure can be detected may be reduced. Furthermore, in the case of the pressure sensor as described above, when pressure is applied in a direction inclined with respect to the stacking direction of the interdigital electrodes and the resistor layer, the sensitivity to such pressure is low.

According to an aspect of the present disclosure, it is desirable to provide a pressure sensor that can reduce a sensation of foreign body and that has a good sensitivity to pressure acting in an inclined direction.

Solution to Problem

A pressure sensor according to one aspect of the present disclosure includes a variable resistance portion, a first electrode, and a second electrode. The variable resistance portion includes a conductive foam elastomer material. The conductive foam elastomer material is a material imparted with conductivity by dispersing carbon fibers in an elastomer material. Also, the conductive foam elastomer material is a material obtained by forming the elastomer material. The variable resistance portion is configured to be compressed under the pressure in accordance with the pressure applied to the variable resistance portion, and to have the electric resistance to decrease as the compression amount increases.

Each of the first electrode and the second electrode includes a conductive material. Each of the first electrode and the second electrode contact with the variable resistance portion. The first electrode and the second electrode are electrically connected to each other via the variable resistance portion. The first electrode and the second electrode are configured to contact with the variable resistance portion at a location having an interval of 0.5 mm or greater with each other.

According to the pressure sensor configured in this manner, the variable resistance portion includes the conductive foam elastomer material. Thus, the surface of a pressure sensitive portion can be made soft compared by employing a pressure sensor including a non-foaming conductive material (for example, conductive rubber or the like). Therefore, such a pressure sensor can reduce the sensation of foreign body even when being placed on a portion to be touched by a person.

Additionally, the pressure sensor of the present disclosure is configured such that the electrical resistance of the variable resistance portion decreases as the compression amount increases. Therefore, unlike a pressure sensor configured such that the electrical resistance decreases as the contact area between interdgital electrodes and a resistor layer increases, the electrical resistance of the variable resistance portion changes as the compression amount of the variable resistance portion changes. Accordingly, even in a case where pressure is applied in a direction inclined with respect to the stacking direction of the first electrode and the second electrode to the variable resistance portion, the pressure can be appropriately detected when the compression amount of the variable resistance portion increases due to the pressure.

Furthermore, the pressure sensor of the present disclosure is configured such that the first electrode and the second electrode contact with the variable resistance portion at a location having the interval of 0.5 mm or greater with each other. Thus, unlike a pressure sensor having an interval between electrodes below 0.5 mm, fine process is unnecessary in forming the electrodes. Thus, the productivity of the pressure sensor can be improved.

REFERENCE SIGNS LIST

1 . . . pressure sensor, 3 . . . variable resistance portion, 5A . . . first electrode, 5B . . . second electrode, 7 . . . substrate, 8 . . . adhesive layer, 9A . . . first terminal, 9B . . . second terminal, 10 . . . foaming agent, 11A, 11B . . . lead wire, 20 . . . compression tester, 21 . . . pedestal, 23 . . . indenter, 25 . . . load cell, 27 . . . low hardness member, 30 . . . resistance meter.

DESCRIPTION OF EMBODIMENTS

The above-described pressure sensor will now be described using exemplary embodiments.

(1) First Embodiment

Figure 1A:
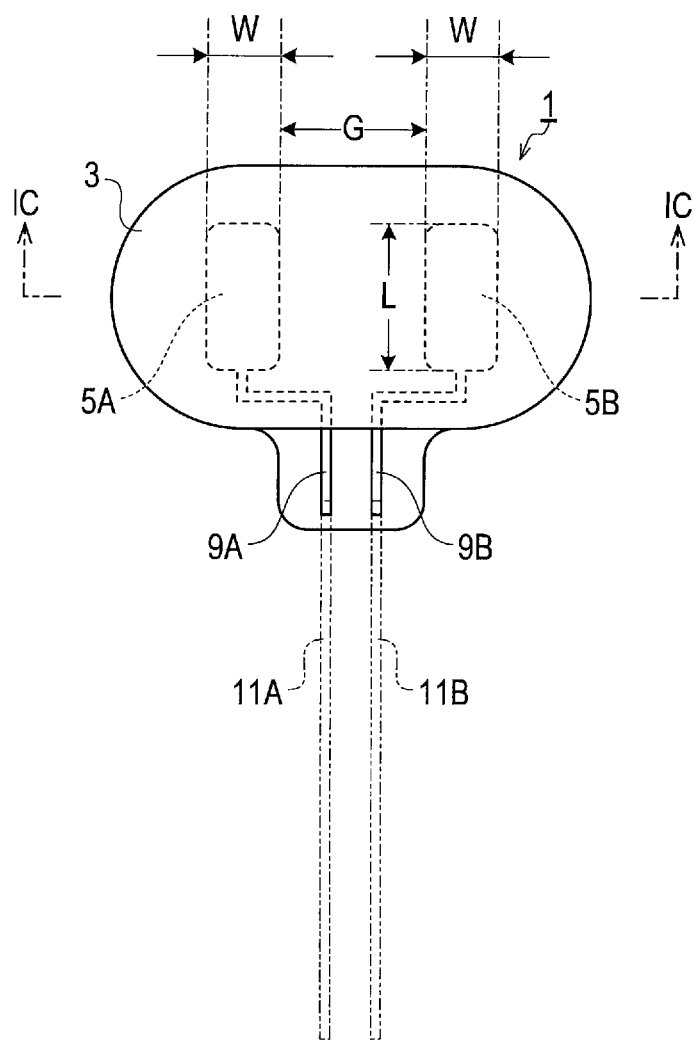
FIG. 1A is a front view of a pressure sensor.
Figure 1B:
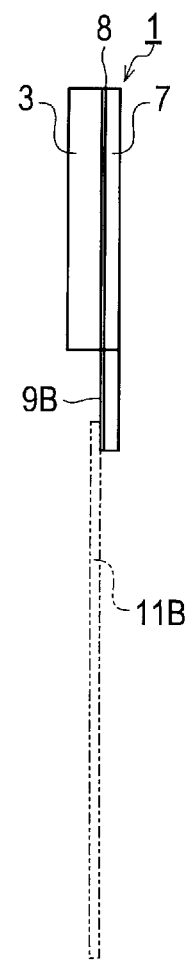
FIG. 1B is a right side view of the pressure sensor.

As illustrated in FIGS. 1A and 1B, a pressure sensor 1 includes a variable resistance portion 3, a first electrode 5A, a second electrode 5B, a substrate 7, an adhesive layer 8, a first terminal 9A, a second terminal 9B, and the like. The variable resistance portion 3 includes a conductive foam elastomer material. The conductive foam elastomer material is a material imparted with electrical conductivity by dispersing carbon fibers into an elastomer material and obtained by foaming the elastomer material.

More specifically, in a first embodiment, an elastomer material obtained by compounding a hydrocarbon-based process oil (paraffin-based process oil having a kinematic viscosity of 30.9 mm$^2$/s at 40° C., a molecular weight of 400, and a SP value of 7.4) as a softener into a styrene-based elastomer (styrene-ethylene-ethylene-propylene-styrene block copolymer (SEEPS) having a molecular weight of 100000 and a styrene content of 30 mass % and available from Kuraray Co., Ltd. under the product name of SEPTON (trade name) 4033) is used as the elastomer material (with a compounding ratio of 22.8 parts by mass of the SEEPS to 77.2 parts by mass of the hydrocarbon-based process oil). Vapor-grown carbon fibers (having an average fiber diameter of 0.15 μm, a fiber length of 10 to 20 μm, and an aspect ratio of 66.7 to 133.3, and available from Showa Denko K.K. under the product name of VGCF (trade name) -H) are used as the carbon fibers. A commercially available foaming agent (available from Dainichiseika Color & Chemicals Mfg. Co., Ltd. under the product name of Daifoam H850) is also formulated to foam the elastomer material.

Figure 1C:
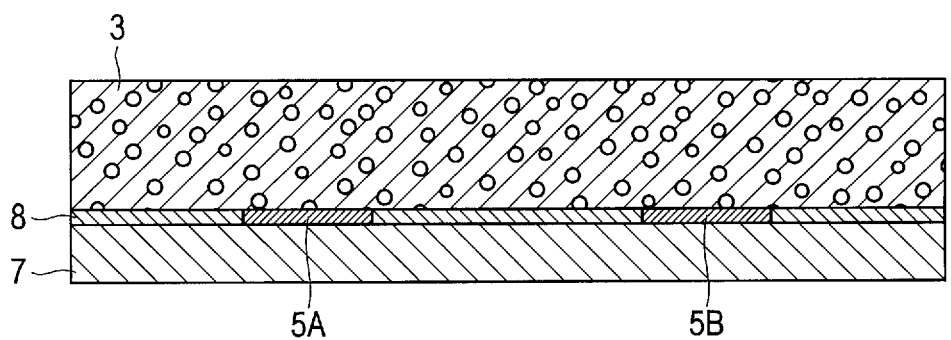
FIG. 1C is an enlarged cross-sectional view of a cross-section taken along the IC-IC line in FIG. 1A.

In the first embodiment, the above-described materials are mixed with a compounding ratio of 35 parts by mass of the vapor-grown carbon fibers and 3 parts by mass of the foaming agent with respect to 100 parts by mass of the elastomer material. The resultant mixture is extruded with a twin screw extruder to obtain a molded article of the conductive foam elastomer material containing an infinite number of closed cells, as illustrated in FIG. 1C. In the first embodiment, the conductive foam elastomer material has an expansion ratio of 2.01 times. The variable resistance portion 3 having a planar shape is configured with such a conductive foam elastomer material. The variable resistance portion 3 is a member that is configured to be compressed under the pressure in accordance with the pressure applied to the variable resistance portion 3, and to have the electric resistance to decrease as the compression amount increases. In addition, the cells are schematically illustrated in FIG. 1C. FIG. 1C is not a drawing indicating that the number or size of actual cells is as illustrated in FIG. 1C.

Each of the first electrode 5A, the second electrode 5B, the first terminal 9A, and the second terminal 9B includes a conductive material. The first electrode 5A, the second electrode 5B, the first terminal 9A, and the second terminal 9B are provided on one surface of the substrate 7. More specifically, in the first embodiment, each of the first electrode 5A, the second electrode 5B, the first terminal 9A, the second terminal 9B, and the substrate 7 is configured by employing a glass epoxy substrate. Each of the first electrode 5A, the second electrode 5B, the first terminal 9A, and the second terminal 9B is configured with a copper foil included in the glass epoxy substrate and an electroless gold plating film provided on the surface of the copper foil. Lead wires 11A and 11B (or flexible flat cables or the like) each having a desired length may be connected to the first terminal 9A and the second terminal 9B.

Figure 2:
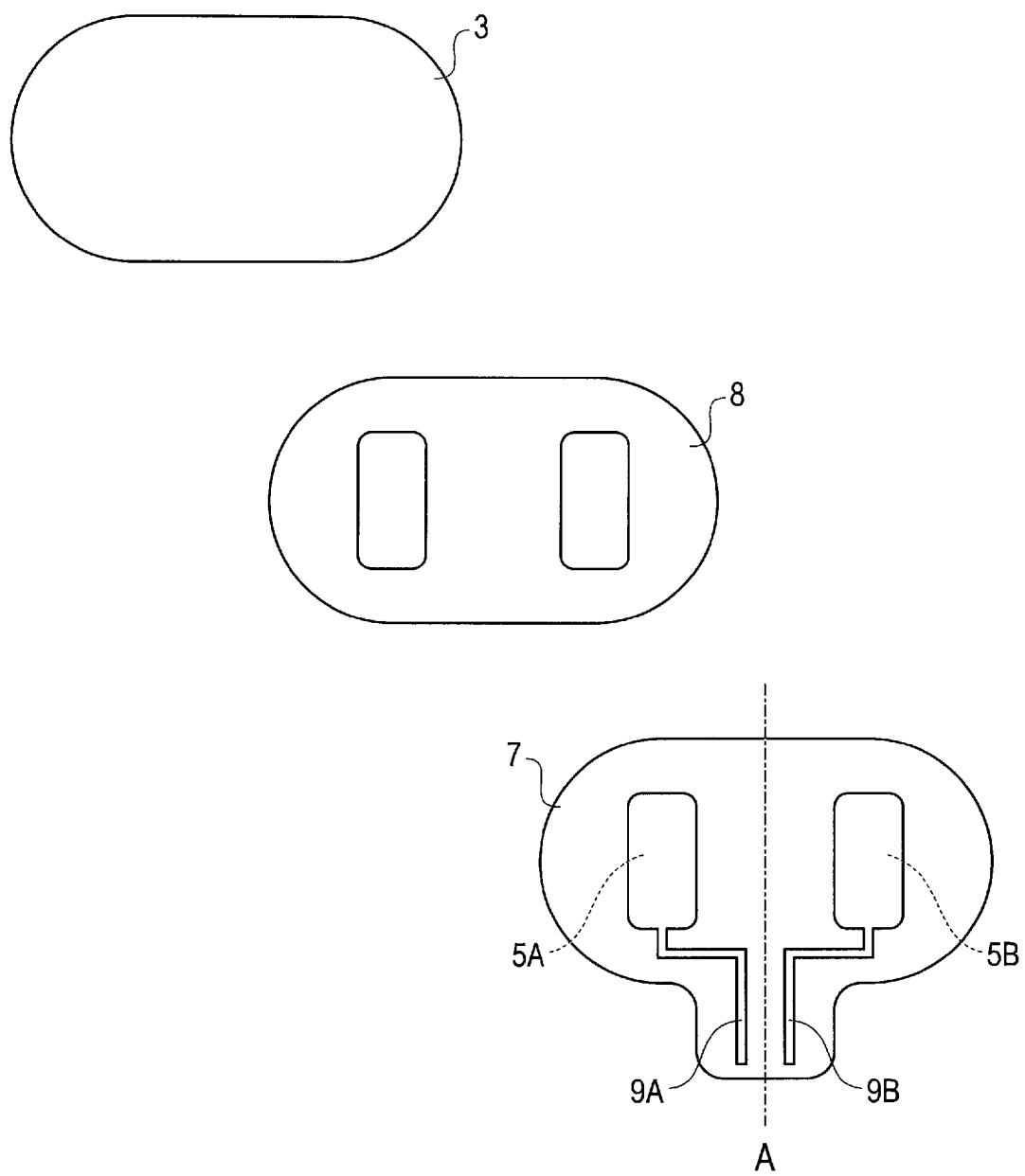
FIG. 2 is an exploded explanatory diagram illustrating a main part of the pressure sensor.

An adhesive layer 8, which is a thin layer of acrylic adhesive, is provided between the variable resistance portion 3 and the substrate 7. As a result, the variable resistance portion 3 and the substrate 7 are adhered via the adhesive layer 8. As illustrated in FIG. 2, the adhesive layer 8 is provided in a range that is not overlapped with the first electrode 5A and the second electrode 5B. The variable resistance portion 3 is disposed to overlap one surface of the substrate 7 (that is, the surface on which the first electrode 5A and the second electrode 5B are provided) in a state where the adhesive layer 8 is sandwiched between the variable resistance portion 3 and the substrate 7. As a result, each of the first electrode 5A and the second electrode 5B is brought into contact with the variable resistance portion 3. The first electrode 5A and the second electrode 5B are in an electrically connectable state via the variable resistance portion 3.

In addition, in the first embodiment, the first electrode 5A and the second electrode 5B are provided in a linearly symmetrical shape on both sides interposing a symmetry axis A, being an imaginary axis, on one surface of the substrate 7 (see FIG. 2). In addition, in the first embodiment, each of the first electrode 5A and the second electrode 5B has an electrode width W of 5 mm and an electrode length L (that is, a length in a direction parallel to the symmetry axis described above) of 10 mm. An interval G of 10 mm is provided between the first electrode 5A and the second electrode 5B.

The pressure sensitive performance of the pressure sensor 1 configured as described above is measured (Embodiment). Two types of commercially available pressure sensors are also prepared for comparison, and the pressure sensitive performance thereof is measured in the same manner (Comparative Examples 1 and 2). Each of these two types of commercially available products is provided with a pair of interdgital electrodes, and is configured such that a resistance value between the electrodes changes in accordance with the contact area between a resistor layer, which is disposed adjacent to the interdgital electrodes, and the interdgital electrodes.

Figure 3:
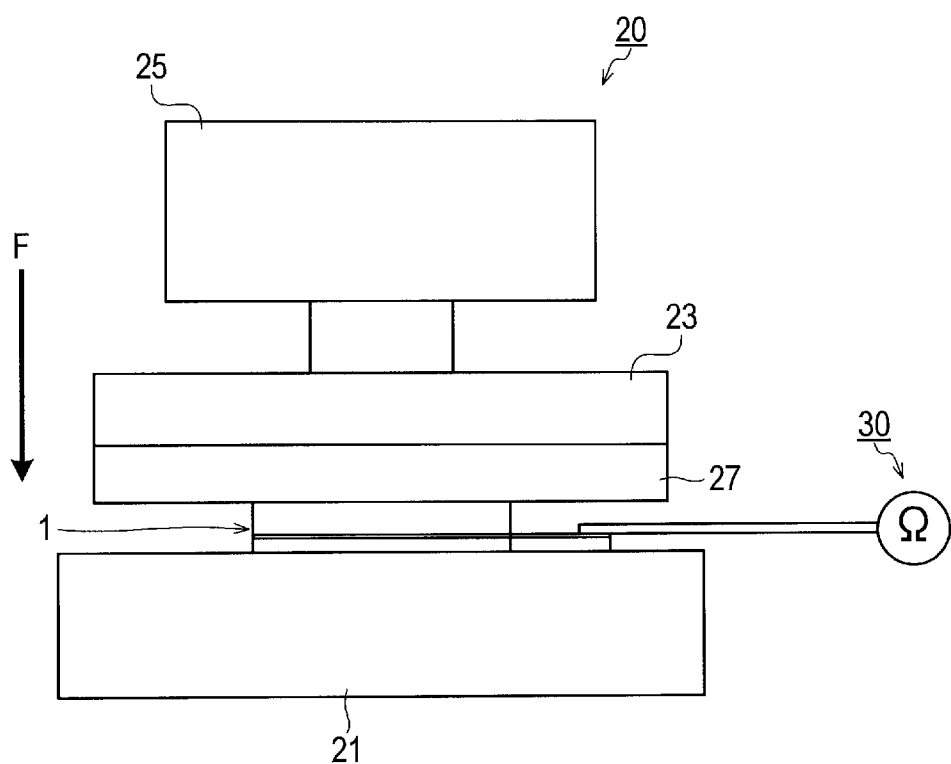
FIG. 3 is an explanatory diagram illustrating a schematic structure of a test device.

A compression tester 20 and a resistance meter 30 are used as test device, the schematic structure of which is illustrated in FIG. 3. The compression tester 20 is a commercially available instrument including a pedestal 21, an indenter 23, a load cell 25, and the like. The resistance meter 30 is a commercially available multimeter capable of measuring voltage and current in addition to resistance. In addition, in the first embodiment, a low hardness member 27 that compresses and deforms when pressurized is attached to a lower surface of the indenter 23. This low hardness member 27 is a member having a size of 40 mm×40 mm×3 mm. The low hardness member 27 is a member that has an Asker C hardness of 40 and that is to be compressed by approximately 4% when a load of 10 kPa is applied. The low hardness member 27 is a member that is to be compressed by approximately 15% when a load of 50 kPa is applied.

In a test method, a pressure sensor is installed on the pedestal 21 of the compression tester 20. The resistance meter 30 is attached to the terminal of the pressure sensor. The compressive load is changed by the compression tester 20, and the changes in the resistance value at that time are measured by the resistance meter 30. For the pressure applied to the pressure sensor, the stress [N] at the time of pressurization is acquired by the load cell 25. The pressure [Pa] is calculated by dividing the stress by the pressurizing area. The measurement results are illustrated in FIG. 4.

Figure 4:
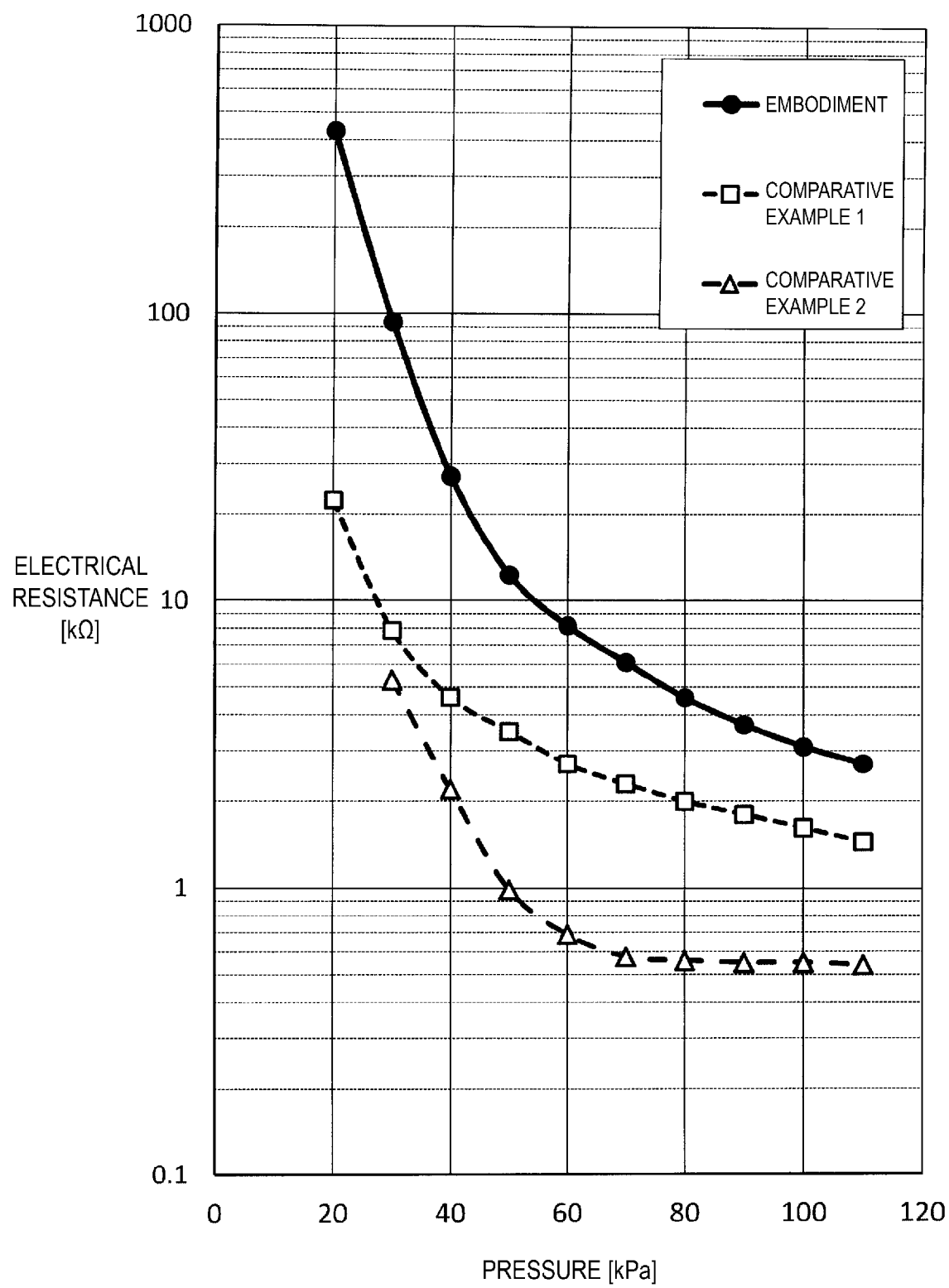
FIG. 4 is a graph illustrating pressure sensitive properties of an embodiment and comparative examples.

As clearly seen from the graph illustrated in FIG. 4, the pressure sensor 1 of the embodiment shows a large change in electrical resistance when the pressure is changed, as compared with the pressure sensors of Comparative Examples 1 and 2. In particular, in Comparative Example 2, the change in electrical resistance becomes extremely small when the pressure is equal to or greater than 70 kPa. Therefore, in Comparative Example 2, when the pressure is equal to or greater than 70 kPa, it becomes difficult to accurately detect a slight change in pressure. In contrast, regarding the pressure sensor 1 of the embodiment, the electric resistance largely varies even when the pressure is equal to or greater than 70 kPa. Thus, the pressure sensor 1 of the embodiment has a high resolution in pressure measurement. Thus, the pressure sensor 1 of the embodiment can detect a slight change in pressure more accurately than the pressure sensors of Comparative Examples 1 and 2.

Figure 5:
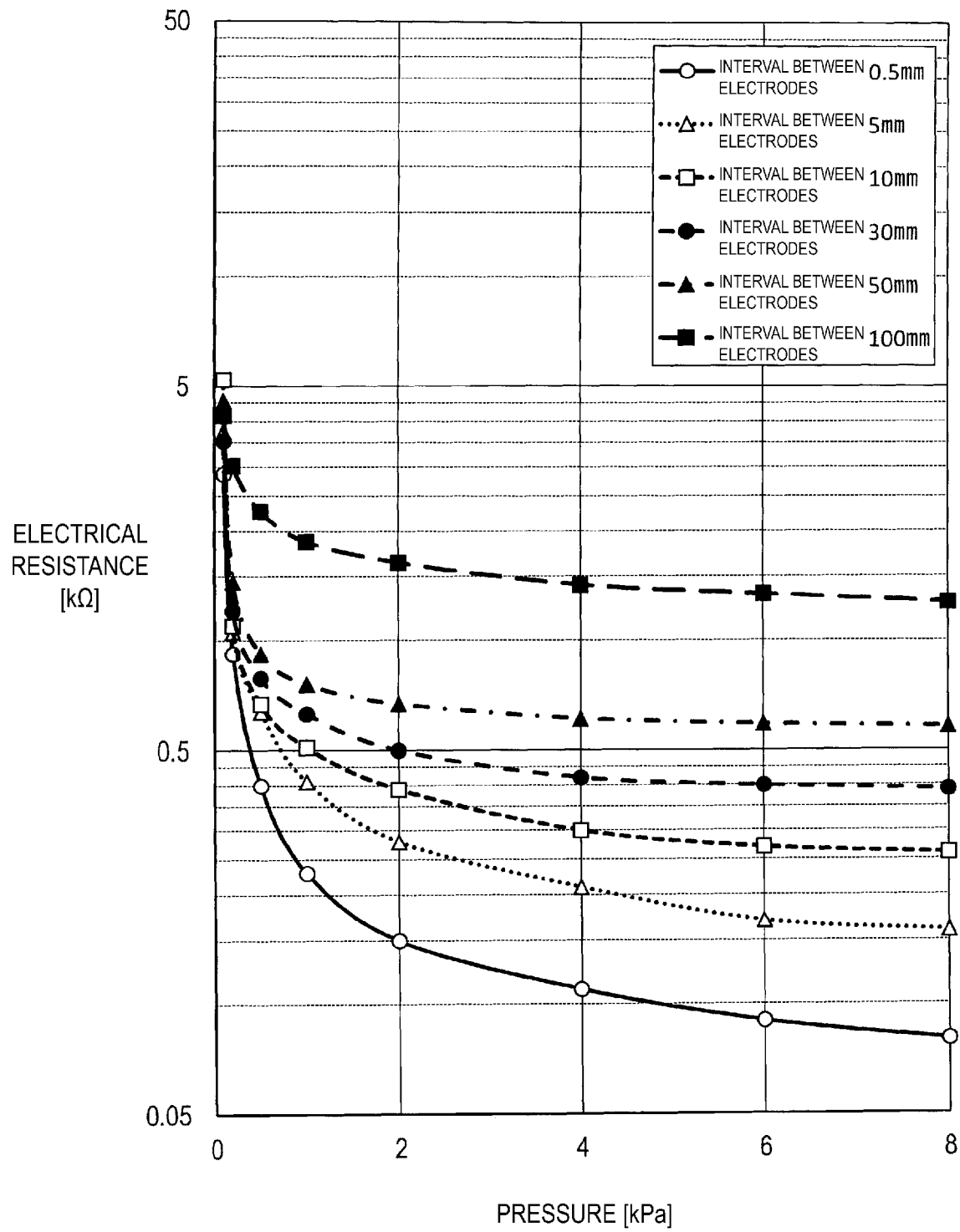
FIG. 5 is a graph illustrating pressure sensitive properties according to the distance between electrodes.

Next, the interval G between the first electrode 5A and the second electrode 5B is altered within a range from 0.5 mm to 100 mm to measure the pressure sensitive performance of the pressure sensor 1. In the present experiment, the electrode length L is set to 30 mm and the electrode width W is set to 5 mm. The measurement results are illustrated in FIG. 5. As clearly seen from the graph illustrated in FIG. 5, it is obvious that the electrical resistance changes in accordance with the pressure even when the interval G between the first electrode 5A and the second electrode 5B is altered within a range from 0.5 mm to 100 mm. Therefore, unlike a pressure sensor having a pair of interdgital electrodes, it is obvious that the pressure sensor 1 can sufficiently exert its performance without excessively reduce the distance between the electrodes. In addition, the interval G between the first electrode 5A and the second electrode 5B may exceed 100 mm.

Figure 6:
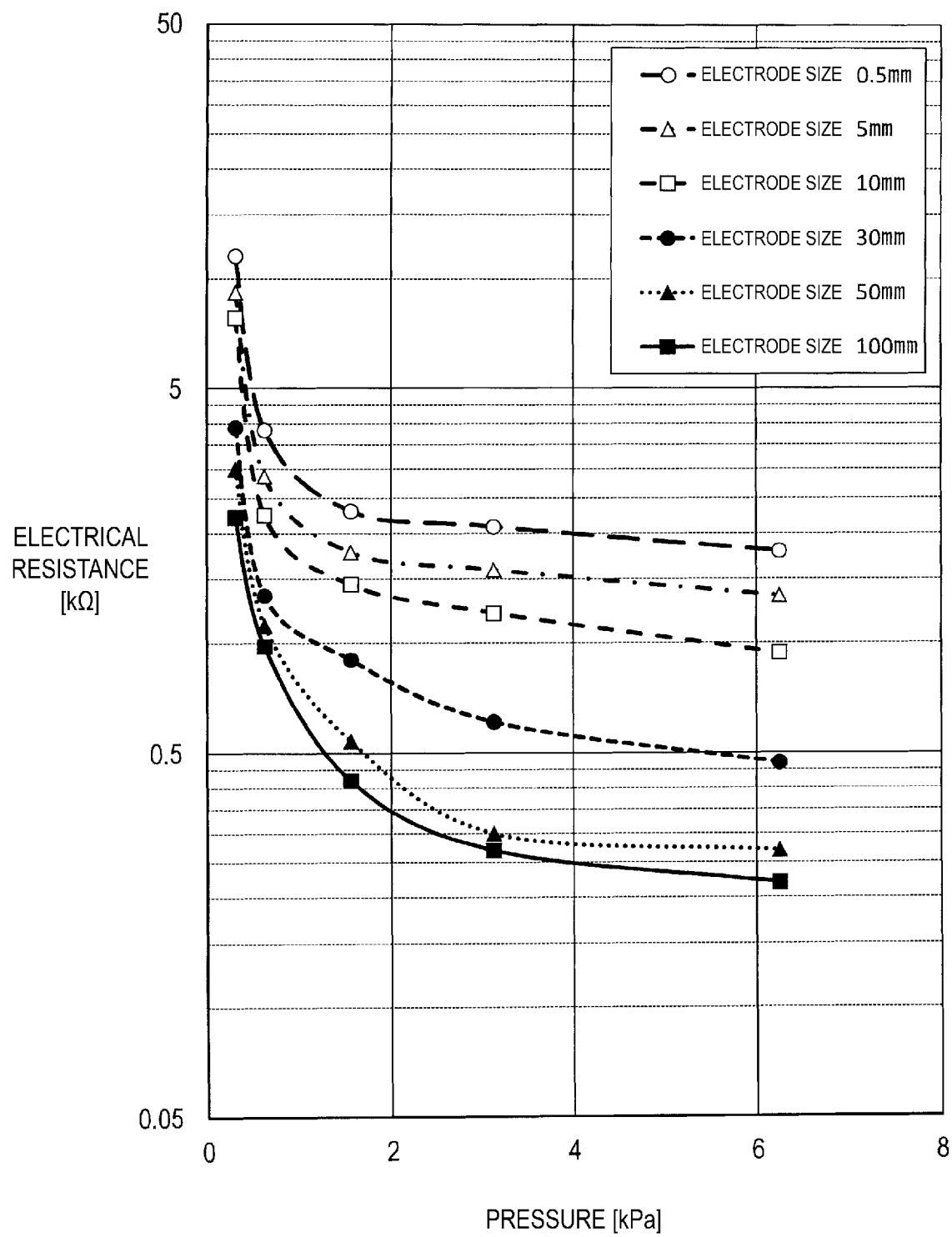
FIG. 6 is a graph illustrating pressure sensitive properties according to the electrode size.

Next, the electrode length L of each of the first electrode 5A and the second electrode 5B is altered within a range from 0.5 mm to 100 mm to measure the pressure sensitive performance of the pressure sensor 1. In the present experiment, the interval G between the first electrode 5A and the second electrode 5B is set to 30 mm, and the electrode width W is set to 5 mm. The measurement results are illustrated in FIG. 6. As clearly seen from the graph illustrated in FIG. 6, it is obvious that the electrical resistance changes in accordance with the pressure even when the electrode length L of each of the first electrode 5A and the second electrode 5B is altered within a range from 0.5 mm to 100 mm.

According to the pressure sensor 1 described above, the variable resistance portion 3 includes the conductive foam elastomer material as described above. Thus, the surface of a pressure sensitive portion can be made soft compared with a pressure sensor configured by employing a non-foaming conductive material (for example, conductive rubber or the like). Therefore, such a pressure sensor 1 can reduce the sensation of foreign body even when being placed on a portion to be touched by a person.

Thus, such a pressure sensor 1 can be utilized as a sensor, for example, adapted to be incorporated into a chair to care the posture of a person seated on the chair. Alternatively, for example, the pressure sensor 1 may be utilized as a sensor, for example, adapted to be incorporated into a shoe to confirm the movement of the center of gravity when a person is walking. In a case where a walking state can be cared as just described, the pressure sensor 1 can be used for the countermeasures by walking to lifestyle-related diseases. Alternatively, for example, the pressure sensor 1 may be incorporated into a bed to record shifting of the weight during bedtime. This can be utilized to improve the quality of sleep.

Additionally, the pressure sensor 1 described above is configured such that the electrical resistance of the variable resistance portion 3 decreases as the compression amount increases. Therefore, unlike a pressure sensor configured such that electrical resistance decreases as the contact area between the interdgital electrodes and a resistor layer increases, the electrical resistance of the variable resistance portion 3 changes as the compression amount of the variable resistance portion 3 changes. As a result, even in a case where pressure is applied in a direction inclined with respect to the stacking direction of the first electrode 5A and the second electrode 5B to the variable resistance portion 3, the pressure can be appropriately detected when the compression amount of the variable resistance portion 3 increases due to the pressure.

Furthermore, the pressure sensor 1 described above is configured such that the first electrode 5A and the second electrode 5B contact with the variable resistance portion 3 at a location having an interval of 0.5 mm or greater with each other. Therefore, unlike a pressure sensor (for example, a pressure sensor having a pair of interdgital electrodes) configured such that the interval between the electrodes is below 0.5 mm, fine process is unnecessary in forming the electrodes. Thus, the productivity of the pressure sensor 1 can be improved.

For example, for a pressure sensor having a pair of interdgital electrodes, it becomes difficult to detect changes in contact area as the number of comb teeth is reduced. Therefore, even when the size of the pressure sensor is reduced, the number of comb teeth cannot be reduced. Thus, in order to reduce the size of the pressure sensor, the size of the comb teeth or the interval between the comb tooth needs to be reduced. For the reasons above, existing pressure sensors are generally configured such that the interval between the combs tooth is set to about 0.2 mm. However, at the time of forming the interdgital electrode with such a fine interval provided between the combs tooth, it requires additional work to process the electrode.

In contrast, the pressure sensor 1 described above is not employing a method in which the electrical resistance changes with changes in the contact area. A method in which the electrical resistance changes as the compression amount of the variable resistance portion 3 changes is employed in the pressure sensor 1 described above. Therefore, it is unnecessary that each of the first electrode 5A and the second electrode 5B is formed in an interdigitated manner. It is also unnecessary that each of the first electrode 5A and the second electrode 5B is formed in a closely interdigitated manner. Accordingly, in a case where the first electrode 5A and the second electrode 5B are provided, an interval of 0.5 mm or greater can be provided between the first electrode 5A and the second electrode 5B. Thus, at the time of processing the first electrode 5A and the second electrode 5B, excessively fine processing is unnecessary. Thus, the productivity of the pressure sensor 1 is improved.

In a case where the interval of 0.5 mm or greater is provided between the first electrode 5A and the second electrode 5B, the upper limit thereof may be set as appropriate within a range that allows attachment to the variable resistance portion 3. However, in view of the balance between sensitivity and size, it is preferable that the interval G be set to be 5 mm or greater and 30 mm or smaller.

(2) Second Embodiment

A second embodiment will be described next. The pressure sensor illustrated in the second embodiment is an example in which the conductive foam elastomer material exemplified in the first embodiment is altered to another conductive foam elastomer material. For points other than the conductive foam elastomer material, there is no difference between the first embodiment and the second embodiment, and thus the description of the points having no difference will be omitted.

In the second embodiment, the elastomer material as a base material includes an elastomer material including a silicone rubber (two-pack type silicone gel composition available from Dow Corning Toray Co., Ltd. under the product name of CY52-276) with compounding 0.5 parts by mass of a hardening accelerator (available from Dow Corning Toray Co., Ltd. under the product name of RD-1) into 100 parts by mass of the silicone rubber. Vapor-grown carbon fibers (having an average fiber diameter of 0.15 µm, a fiber length of 10 to 20 µm, and an aspect ratio of 66.7 to 133.3, and available from Showa Denko K.K. under the product name of VGCF (trade name) -H) are used as the carbon fibers. A commercially available foaming agent (available from Dainichiseika Color & Chemicals Mfg. Co., Ltd. under the product name of Daifoam H850) is also formulated to foam the elastomer material.

In the second embodiment, the materials are mixed with a compounding ratio of 20 parts by mass of the vapor-grown carbon fibers and 10 parts by mass of the foaming agent with respect to 100.5 parts by mass of the elastomer material (100 parts by mass of the silicone rubber and 0.5 parts by mass of the hardening accelerator). The mixture is molded in the same manner as in the first embodiment. In the second embodiment, the conductive foam elastomer material has an expansion ratio of 2.62 times.

The afore-mentioned pressure sensor of the second embodiment is configured such that the variable resistance portion 3 includes the conductive foam elastomer material as described above. Thus, the surface of a pressure sensitive portion can be made soft compared with a pressure sensor configured by employing a non-foaming conductive material (for example, conductive rubber or the like). Therefore, such a pressure sensor can reduce the sensation of foreign body even when being placed on a portion to be touched by a person.

Furthermore, even in the pressure sensor of the second embodiment, the electric resistance of the variable resistance portion 3 decreases as the compression amount increases. Therefore, unlike a pressure sensor configured such that electrical resistance decreases as the contact area between the interdgital electrodes and a resistor layer increases, the electrical resistance of the variable resistance portion 3 changes as the compression amount of the variable resistance portion 3 changes. As a result, even in a case where pressure is applied in a direction inclined with respect to the stacking direction of the first electrode 5A and the second electrode 5B to the variable resistance portion 3, the pressure can be appropriately detected when the compression amount of the variable resistance portion 3 increases due to the pressure.

Further, the pressure sensor of the second embodiment is also configured such that the first electrode 5A and the second electrode 5B contact with the variable resistance portion 3 at a location having an interval of 0.5 mm or greater with each other. Therefore, unlike a pressure sensor (for example, a pressure sensor having a pair of interdgital electrodes) configured such that the interval between the electrodes is below 0.5 mm, fine process is unnecessary in forming the electrodes. Thus, the productivity of the pressure sensor can be improved.

(3) Other Embodiments

Exemplary embodiments have been used to describe the pressure sensor, but each of the foregoing embodiments is only an example of one aspect of the present disclosure. In other words, the present disclosure is not limited to the exemplary embodiment described above and can be embodied in various forms without departing from the technical concept of the present disclosure.

For example, in the embodiments described above, the components and compounding ratios of the conductive foam elastomer material are described by using two examples, but the component and compounding ratio of the conductive foam elastomer material is not limited to the two examples described above. For example, when a styrene-based elastomer is used as the elastomer material, in addition to the aforementioned styrene-ethylene-ethylene-propylene-styrene block copolymer (SEEPS), a styrene-isoprene-styrene block copolymer (SIS), a styrene-butadiene-styrene block copolymer (SBS), a styrene-ethylene-propylene block copolymer (SEP), a styrene-ethylene-butylene-styrene block copolymer (SEBS), a styrene-ethylene-propylene-styrene block copolymer (SEPS), and the like may be used. One kind of these styrene-based elastomers can be used alone or two or more kinds of these styrene-based elastomers can be used as a mixture.

Furthermore, when a silicone rubber is used as the elastomer material, for example, a vinyl-methyl-silicone rubber, a methyl-silicone rubber, a phenyl-methyl-silicone rubber, a fluorosilicone rubber, and the like can be used. One kind of these silicone rubbers can be used alone or two or more kinds of these silicone rubbers can be used as a mixture.

For carbon fibers, carbon fibers having a diameter of 0.01 µm or greater and 0.2 µm or smaller, a fiber length of 1 µm or greater and 500 µm or smaller, an aspect ratio of 10 or greater and 500 or smaller may be applied. When such carbon fibers are used, the pressure sensitive properties of the variable resistance portion 3 can be improved compared with a case where coarser carbon fibers (for example, PAN-based carbon fibers or pitch-based carbon fibers) or a conductive filler (for example, artificial graphite or the like) other than carbon fibers is used.

When the elastomer material is a styrene-based elastomer, the compounding amount of the carbon fibers is set to 20 parts by mass or greater; therefore, a predetermined conductivity can be applied to the conductive foam elastomer material. Furthermore, when the elastomer material is a styrene-based elastomer, the compounding amount of the carbon fibers is set to 50 parts by mass or smaller; therefore, the hardness or brittleness of the conductive foam elastomer material can be inhibited from being excessively high.

When the elastomer material is a silicone rubber, the compounding amount of the carbon fibers is set to 5 parts by mass or greater; therefore, a predetermined conductivity can be applied to the conductive foam elastomer material. Furthermore, when the elastomer material is a silicone rubber, the compounding amount of the carbon fibers is set to 30 parts by mass or smaller; therefore, the hardness or brittleness of the conductive foam elastomer material can be inhibited from being excessively high.

When the elastomer material is a styrene-based elastomer, the expansion ratio of the conductive foam elastomer material is set to 1.45 times or greater; therefore, a material preferably changeable in resistance with respect to the compression amount can be obtained. Also, the expansion ratio of the conductive foam elastomer material is set to 3.6 times or smaller and thereby the brittleness of the conductive foam elastomer material can be inhibited from being excessively high. To foam the styrene-based elastomer, a rubber, resin, or general-purpose foaming agent applicable to the styrene-based elastomer may be compounded into a silicone rubber. The compounding amount of the foaming agent may be adjusted so that the expansion ratio described above can be achieved.

When the elastomer material is a silicone rubber, the expansion ratio of the conductive foam elastomer material is set to 1.5 times or greater; therefore, a material preferably changeable in resistance with respect to the compression amount can be obtained. Furthermore, the expansion ratio of the conductive foam elastomer material is set to 4 times or smaller and thereby the brittleness of the conductive foam elastomer material can be inhibited from being excessively high. To foam the silicone rubber, a rubber, resin, or a general purpose foaming agent applicable to the silicone rubber may be compounded into the silicone rubber. The compounding amount of the foaming agent may be adjusted so that the expansion ratio described above can be achieved.

Additionally, in each of the embodiments described above, a specific shape is illustrated for each of the first electrode 5A and the second electrode 5B, but the shape of each of the electrodes can be altered as desired.

(4) Complement

Note that as is clear from the exemplary embodiment described above, the pressure sensor according to the present disclosure may be further provided with configurations such as those given below.

First, for the pressure sensor of the present disclosure, the elastomer material may be a silicone rubber. The carbon fiber may have a diameter of 0.01 µm or greater and 0.2 µm or smaller, a fiber length of 1 µm or greater and 500 µm or smaller, an aspect ratio of 10 or greater and 500 or smaller, and a compounding amount of the carbon fibers is 5 parts by mass or greater and 30 parts by mass or smaller in terms of a mass ratio to 100 parts by mass of the elastomer material. The expansion ratio of the conductive foam elastomer material may be 1.5 times or greater and 4 times or smaller.

Alternatively, for the pressure sensor of the present disclosure, the elastomer material may be a styrene-based elastomer. The carbon fiber may have a diameter of 0.01 µm or greater and 0.2 µm or smaller, a fiber length of 1 µm or greater and 500 µm or smaller, an aspect ratio of 10 or greater and 500 or smaller, and a compounding amount of the carbon fibers is 20 parts by mass or greater and 50 parts by mass or smaller in terms of a mass ratio to 100 parts by mass of the elastomer material. The expansion ratio of the conductive foam elastomer material may be 1.45 times or greater and 3.6 times or smaller.

According to the pressure sensor configured as just described, the conductive foam elastomer material is configured as described above. Thus, a person can be inhibited from having a sensation of foreign body when touching the pressure sensor, and the pressure sensor with good sensitivity to pressure acting in the inclined direction can be configured.

Additionally, the pressure sensor of the present disclosure may be configured such that the first electrode and the second electrode contact with the variable resistance portion at a location having an interval of 5 mm or greater and 30 mm or smaller with each other.

According to the pressure sensor configured as just described, the interval between the first electrode and the second electrode is 5 mm or greater and 30 mm or smaller. Unlike a pressure sensor having a pair of interdgital electrodes, the pressure sensor configured as just described is configured such that a sufficient interval can be disposed between the first electrode and the second electrode. Therefore, fine process is unnecessary. Consequently, the productivity of the pressure sensor is improved.

Additionally, the pressure sensor of the present disclosure may include the substrate configured in a planar shape, and the first electrode and the second electrode may be provided on one surface of the substrate. The variable resistance portion may be configured in a planar shape and arranged on one surface of the substrate to overlap the substrate, to configure the first electrode and the second electrode being sandwiched between the substrate and the variable resistance portion. The first electrode and the second electrode may be provided in a linearly symmetrical shape on both sides interposing the symmetry axis, being an imaginary axis, on one surface of the substrate. Each of the first electrode and the second electrode may be configured such that the length in the direction parallel to the symmetry axis is 0.5 mm or greater and 100 mm or smaller.

According to the pressure sensor configured as just described, the first electrode and the second electrode are disposed in parallel at an interval within a range of 0.5 mm or greater to 100 mm or smaller. Thus, such a pressure sensor can sufficiently ensure a region that can be a conductive path between the first electrode and the second electrode, and the sensitivity of the pressure sensor can be enhanced.

The invention claimed is:

1. A pressure sensor, comprising:
 a substrate configured in a planar shape;
 a variable resistance portion; and
 first electrode and second electrode, wherein
 the variable resistance portion includes a conductive foam elastomer material,
 the conductive foam elastomer material is a material imparted with conductivity by dispersing carbon fibers in an elastomer material and obtained by foaming the elastomer material,
 the variable resistance portion is configured to be compressed under the pressure in accordance with the pressure applied to the variable resistance portion, and to have the electrical resistance to decrease as the compression amount increases,
 each of the first electrode and the second electrode includes a conductive material,
 each of the first electrode and the second electrode contact with the variable resistance portion to be electrically connected to each other via the variable resistance portion, the first electrode and the second electrode are configured to contact with the variable resistance portion at a location having an interval of 0.5 mm or greater with each other, the first electrode and the second electrode are provided on one face of the substrate, the variable resistance portion is configured in a planar shape and is arranged on one surface of the substrate to overlap the substrate, configuring the first electrode and the second electrode being sandwiched between the substrate and the variable resistance portion, and the first electrode and the second electrode are provided in a linearly symmetrical shape on both sides interposing a symmetry axis, being an imaginary axis, on one surface of the substrate, and each of the first electrode and the second electrode have the length in a direction parallel to the symmetry axis is 0.5 mm or greater and 100 mm or smaller.

2. The pressure sensor according to claim 1, wherein the elastomer material is a silicone rubber, each of the carbon fibers has a diameter of 0.01 μm or greater and 0.2 μm or smaller, a fiber length of 1 μm or greater and 500 μm or smaller, an aspect ratio of 10 or greater and 500 or smaller, and the compounding amount of the carbon fibers is 5 parts by mass or greater and 30 parts by mass or smaller in terms of a mass ratio to 100 parts by mass of the elastomer material, and the conductive foam elastomer material has an expansion ratio of 1.5 times or greater and 4 times or smaller.

3. The pressure sensor according to claim 1, wherein the elastomer material is a styrene-based elastomer, each of the carbon fibers has a diameter of 0.01 μm or greater and 0.2 μm or smaller, a fiber length of 1 μm or greater and 500 μm or smaller, an aspect ratio of 10 or greater and 500 or smaller, and the compounding amount of the carbon fibers is 20 parts by mass or greater and 50 parts by mass or smaller in terms of a mass ratio to 100 parts by mass of the elastomer material, and the conductive foam elastomer material has an expansion ratio of 1.45 times or greater and 3.6 times or smaller.

4. The pressure sensor according to claim 1, wherein the first electrode and the second electrode are configured to contact with the variable resistance portion at a location having an interval of 5 mm or greater and 30 mm or smaller with each other.

5. The pressure sensor according to claim 2, wherein the first electrode and the second electrode are configured to contact with the variable resistance portion at a location having an interval of 5 mm or greater and 30 mm or smaller with each other.

6. The pressure sensor according to claim 3, wherein the first electrode and the second electrode are configured to contact with the variable resistance portion at a location having an interval of 5 mm or greater and 30 mm or smaller with each other.

* * * * *